May 31, 1949.     C. M. SEIBEL     2,471,904
HELICOPTER ROTOR DRIVE AND CONTROL SYSTEM
Filed Sept. 11, 1947     2 Sheets-Sheet 1

CHARLES M. SEIBEL
INVENTOR

BY *Hubert Miller*

ATTORNEY

May 31, 1949.

C. M. SEIBEL 2,471,904

HELICOPTER ROTOR DRIVE AND CONTROL SYSTEM

Filed Sept. 11, 1947

CHARLES M. SEIBEL
INVENTOR

BY Hubert Miller
ATTORNEY

Patented May 31, 1949

2,471,904

UNITED STATES PATENT OFFICE 2,471,904

HELICOPTER ROTOR DRIVE AND CONTROL SYSTEM

Charles M. Seibel, Wichita, Kans.

Application September 11, 1947, Serial No. 773,328

12 Claims. (Cl. 170—135.23)

This invention relates to an improvement in helicopter rotor drives and control systems, and more particularly to a drive and control which makes it possible to eliminate the usual free-wheeling unit between the engine and the main rotor.

It is conventional practice to provide helicopters with a starter and starter battery for starting the engine, a free wheeling unit between the engine and transmission to permit autorotation of the vertical lift rotor or rotors to afford safe descent without power, and to provide a rotor brake to stop the rotor after the craft has landed and power has been shut off. All three of these units are both heavy and rather expensive, and the free wheeling unit, at least, requires considerable maintenance.

It is an object of this invention to provide a rotor drive which permits the rotor itself to be used to start the engine, either while on the ground or in the air, thus making it possible to omit the starter and starter battery along with their cost and weight disadvantage.

It is another object to provide a rotor drive which eliminates the free wheeling unit along with its cost, weight and maintenance disadvantages, yet which is fully as safe, insofar as operation of the helicopter is concerned, as one which includes a free wheeling unit, because it provides for almost immediate release of the rotor to autorotate in case of engine failure.

It is another object to provide a rotor drive which eliminates the necessity of providing a separate rotor brake, thus saving the cost and weight of this unit.

It is still a further object to provide a control system for this rotor drive which enables the pilot to control the rotor torque compensating means as well as the rotor drive with a single pilot's control.

Briefly these and other objects are attained by providing a normally engaged clutch between the engine and the vertical lift rotor, and by operably connecting a single pilot's control, for example the foot pedals, to actuate both the clutch and the variable means which counteracts the torque of the lifting rotor. The operating linkage between the pilot's control and these two mechanisms is such that during normal flight the control serves to selectively vary the torque compensation only. When power is greatly reduced, however, or when the engine dies and a condition of zero rotor torque is approached, the pilot's natural response is to move the control to further reduce rotor torque compensation. During this range of movement of the control, the clutch is disengaged and is held disengaged so long as the control is within this range, so that the rotor is free to autorotate. The control linkage additionally permits overtravel of the control after the clutch is disengaged, to continue to afford directional control of the aircraft during autorotation of the rotor. This overtravel range of movement serves to vary rotor torque compensation between low positive, through zero, to low negative.

With such an arrangement it is plain to see that the clutch serves equally as well, and as safely, as the commonly used free wheeling unit which it replaces. It frees the rotor automatically insofar as the pilot is concerned. It is unnecessary for the pilot to consciously operate the control to free the clutch so that autorotation may begin. Any condition which arises which produces zero or near zero rotor torque simultaneously reduces the need for compensating for rotor torque. The pilot simply moves the control to reduce torque compensation, and this movement of the control automatically frees the rotor by disengaging the clutch.

The construction and operation of one embodiment of the invention, together with other objects attending its use, will be clearly understood when the following description is read in connection with the accompanying drawings, in which—

Figure 3 is a schematic perspective view of one type of pilot's control which may be used in connection with the invention;

Figure 5 is a schematic view in side elevation of the aft end of the tail boom and a torque counteracting propeller.

Figure 1:
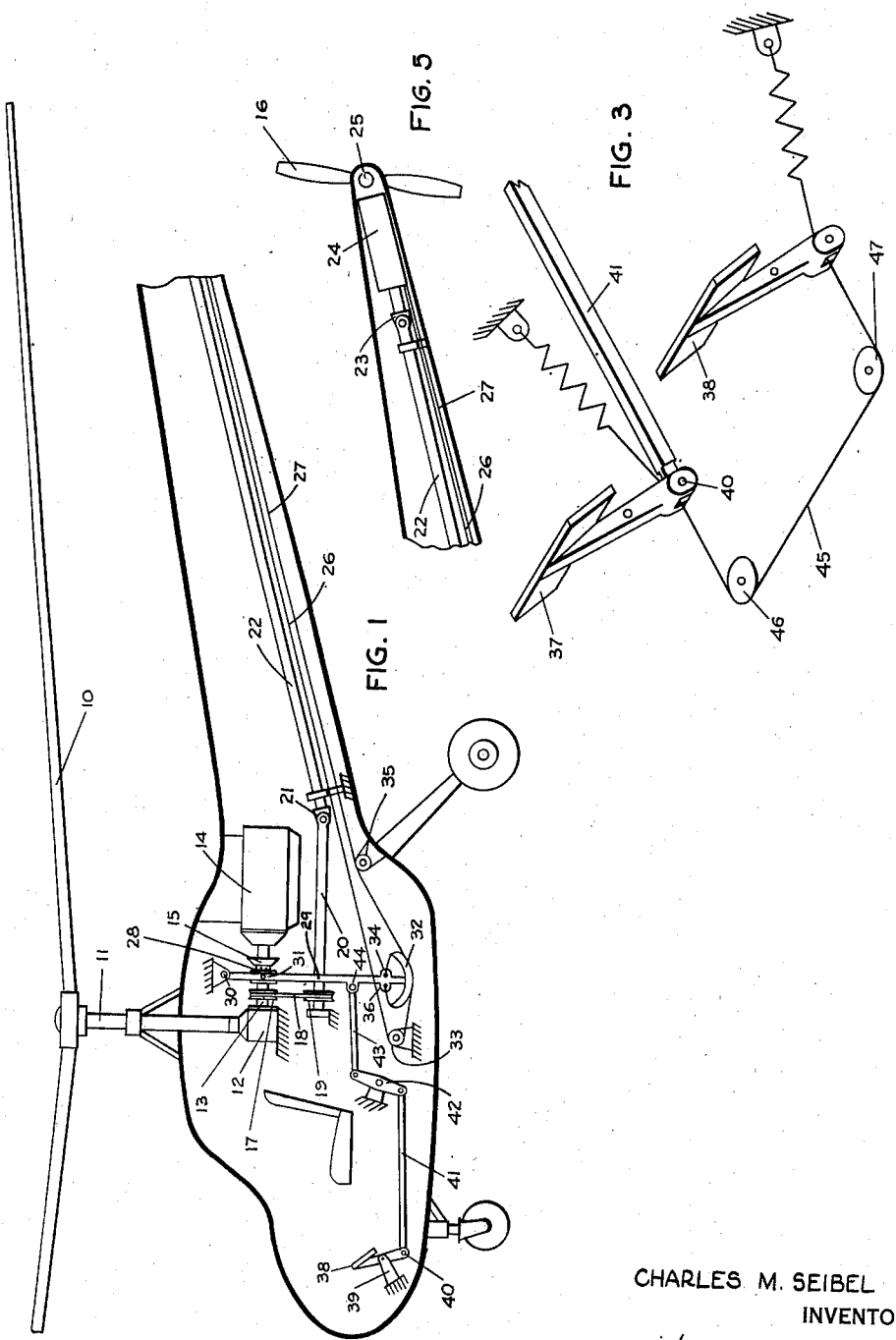
Figure 1 is a general arrangement view in side elevation of a helicopter incorporating one embodiment of the invention, the fuselage and tail boom structure being shown in outline only.

As will be seen in Figure 1, a helicopter embodying the invention includes a main lifting rotor 10, a suitably supported rotor drive shaft 11, a transmission 12 for driving the shaft 11, a stub shaft 13 for transmitting power from a suitably mounted engine 14 through a clutch 15 to the transmission. It also includes a means for compensating for the torque created by the powered rotation of the main rotor. Such means is illustrated in the herein described embodiment of the invention as a variable pitch propeller 16 whose axis of rotation is disposed transverse to the longitudinal axis of the helicopter, although it may take the form of a controllable jet air blast, a variable speed propeller with fixed or variable pitch blades, or any other conventional variable means of counteracting the main rotor torque.

Figure 2:
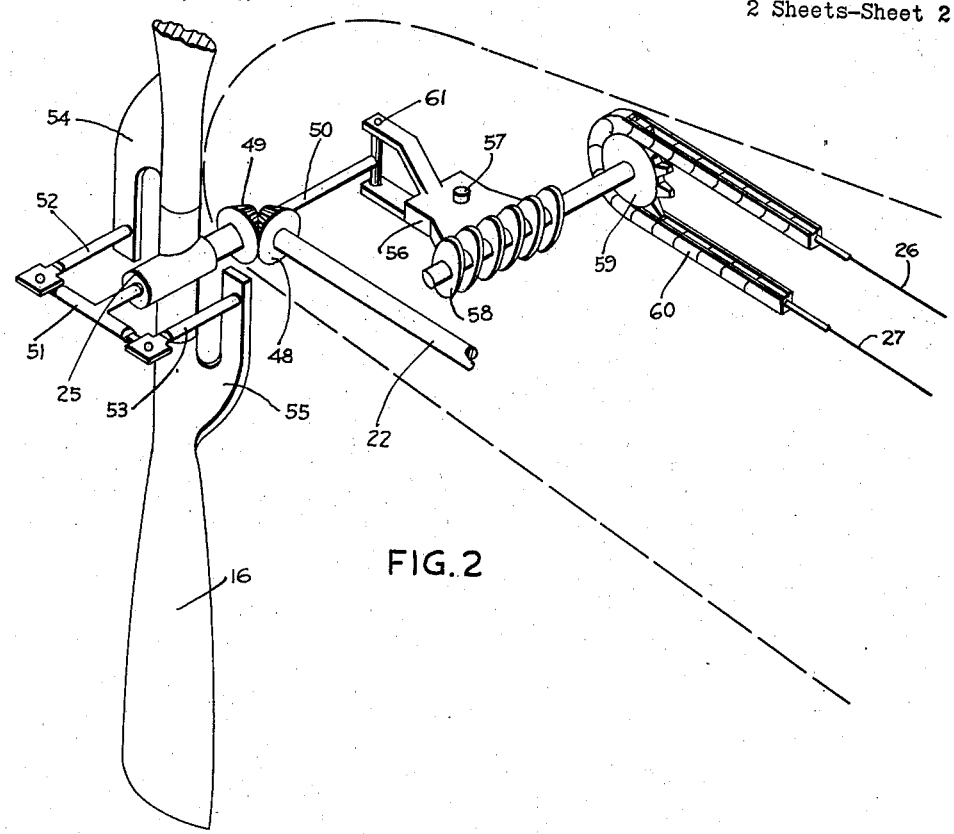
Figure 2 is a schematic perspective view of the type of variable torque compensating means used in this instance to illustrate the application of the invention to a conventional helicopter.

This propeller 16 will hereinafter be called the tail rotor. As will be seen, it is driven through one or more pulleys 17 mounted on stub shaft 13, one or more V-belts 18 driving pulleys 19 fixed on jack shaft 20. Power is transmitted from this jack shaft 20 through a universal joint 21, through a suitably journaled tail rotor drive shaft 22, through a universal joint 23, through a gear box 24, to the tail rotor drive shaft 25. The pitch of the blades of the tail rotor is controlled by means of two cables 26 and 27 operably connected to a suitable conventional mechanism, such as is illustrated in Figure 2, which mechanism will be hereinafter described.

Returning to Figure 1, it will be seen that a clutch throw-out bearing 28 is controlled by a lever type yoke 29. One end of this yoke is pivotally mounted on the aircraft structure, as indicated by the numeral 30. The yoke proper is pivotally connected at 31 to the clutch throwout bearing 28, and the free end of the yoke rigidly carries an arcuate pulley type sector 32.

The cable run 26 passes partially around a structure mounted pulley 33, and its end loops over one end of the sector 32 and is firmly secured to the upper surface of the sector at 34. The other cable run 27 passes over an idler pulley 35, and its end then loops over the opposite end of the sector 32 and is secured thereto at 36. Thus when the lever 29 is rocked fore and aft about its axis 30, the cables 26 and 27 are forced to move in opposite directions.

As a means of rocking the lever 29 fore and aft about its axis 30, there is provided a pilot's control, in this case coordinated foot pedals 37 and 38, Figure 3. These pedals are pivotally mounted by means of brackets 39 to the aircraft structure. The lower end of one of these pedals is pivotally connected at 40 to one end of a rod 41, the other end of which is pivotally connected to one end of a cross arm 42. This cross arm is pivotally mounted intermediate its ends on the aircraft structure, as shown in Figure 1, and its other end is pivotally connected to a link 43. The opposite end of the link 43 is pivotally connected to the lever type yoke 29 at 44. Since the movement of the two pedals 37 and 38 is coordinated by means of cable 45 (Fig. 3) running over structure mounted pulleys 46 and 47, it is plain to see that forward movement of the pedal 38 will move the lower end of the lever 29 rearward, and the sector 32 will simultaneously move the cable 26 forward and the cable 27 rearward. Similarly forward pressure on the pedal 37 will move the lever 29 and the cables 26 and 27 in the opposite directions.

Referring to Figure 2, a conventional construction is shown for a variable pitch torque counteracting tail rotor. The shaft 22 rotates the propeller through beveled gears 48 and 49. The propeller hub 25 is bored to serve as a housing for a reciprocable shaft 50. On its outer end this shaft rigidly carries a cross arm 51, the opposite ends of which are pivotally connected to links 52 and 53, which are in turn pivotally connected to pitch changing horns 54 and 55, which are rigidly attached respectively to the propeller blades. Controlled movement of the shaft 50 is accomplished by means of a gear sector 56 mounted on a pivot pin 57 and meshed with a worm gear 58, which is rotatable in either direction by means of a sprocket 59 driven by a chain 60. The opposite ends of the chain 60 are respectively attached to the cables 26 and 27. That end of the sector 56 opposite its teeth is pivotally connected at 61 to the inner end of the shaft 50, so that as the sector is pivoted about its axis 57 by the worm 58, the shaft is moved longitudinally in its housing, and thus changes the blade pitch.

Figure 4:
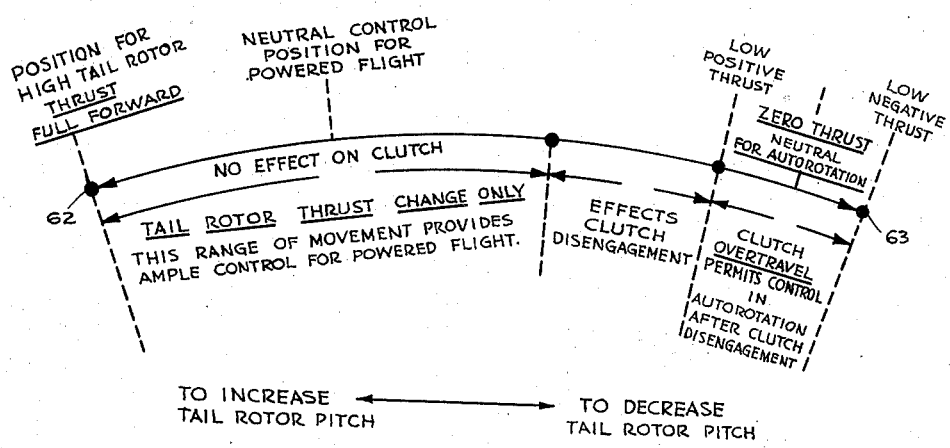
Figure 4 is a range of movement chart illustrating the effective action of the single pilot's control.

With the mechanism described it will be seen that the pilot's control 37 and 38, in moving the lever 29 fore and aft, controls the blade pitch and consequently the thrust of the tail rotor 16, and that it also engages and disengages the clutch, if moved sufficiently. As mentioned at the beginning of this description the linkage between the pilot's control, the clutch, and the tail rotor blade pitch adjusting mechanism is such that the tail rotor thrust may be varied, as required, for normal flight without disengaging the clutch. The relative effect of the movement of the pilot's control within its permitted range of movement is illustrated clearly in Figure 4. For clarity the movement of one pedal only has been considered. The arcuate line represents the total range of movement of the pilot's control between its limits 62 and 63. As will be seen by the legends, approximately the forward 60% of the permitted movement provides variable tail rotor thrust for powered flight. When power is greatly reduced or approaches zero, as when the engine dies, a condition of zero main rotor torque is also approached. The pilot's natural reaction is to keep the ship headed in its direction of travel. To do this he moves the control further aft to further reduce tail rotor thrust. During this natural movement by the pilot, the clutch is disengaged by the yoke 29, and the main rotor is then free to autorotate. Overtravel for the clutch throwout bearing 28, which allows further aft movement of the pilot's control without affecting the clutch, permits change of tail rotor thrust from low positive, through zero thrust, to low negative or reverse thrust, thus permitting the pilot to head the ship in any desired direction during autorotation of the main rotor.

Should the engine difficulty prove to be only minor, the necessary adjustments may be made during autorotational flight, and the engine may then be started by engaging the clutch and using the inertia of the autorotating main rotor.

When a landing is made, the clutch is disengaged, the engine is shut off, and the pilot can then slip his clutch and use the inertia of the engine to bring the main rotor to a stop.

With the helicopter on the ground and the main rotor at rest, the engine may be started by engaging the clutch, manually rotating the main rotor, and then disengaging the clutch as soon as the engine starts.

It will be seen from the foregoing description that this invention provides for full control of the helicopter under all conditions; and that it makes possible the elimination of the conventionally provided starter, starter battery, freewheeling unit, and rotor brake.

Having described the invention with sufficient clarity to enable those familiar with the art to construct and use it, I claim:

1. In a helicopter, the combination comprising: A vertical lift rotor; variable means for counteracting the torque created by the powered rotation of said rotor; disconnectible means through which power is transmitted to the rotor; a pilot's control for the disconnectible means; and means operably connecting said pilot's control to the variable torque counteracting means.

2. In a helicopter, the combination comprising: A vertical lift rotor; a torque compensating propeller; means for varying the thrust of the propeller; disconnectible means for driving the rotor; a pilot's control for said disconnectible means; and means operably connecting the pilot's control to the thrust varying means.

3. In a helicopter, the combination comprising: A vertical lift or main rotor; a torque compensating propeller; a power unit; a clutch through which power is transmitted to the main rotor; means for varying the thrust of the torque compensating propeller; and a single pilot operable control operably connected to actuate both the clutch and the thrust varying means.

4. In a helicopter, the combination comprising: A vertical lift rotor; a torque compensating propeller having variable thrust characteristics; a power unit; a clutch connecting the power unit and the vertical lift rotor; means for varying the thrust of the torque compensating propeller; a manual control connected with said clutch to engage and disengage it during an intermediate range of the permitted movement of said control; and means connecting said manual control to the thrust varying means for varying the thrust while the clutch is engaged, while it is being disengaged during said intermediate range of movement, and after it has been disengaged.

5. In a vertical lift aircraft the combination comprising: A vertical lift rotor connected to drive a torque compensating propeller; a power unit for driving the rotor; a clutch through which power is transmitted to the rotor; means for varying the pitch of the torque compensating propeller; and a single pilot operable control means for selectively controlling both the said pitch varying means and the clutch.

6. In a vertical lift aircraft, the combination comprising: A vertical lift rotor or propeller; a torque compensating propeller; drive means connecting the two propellers; a power unit; a clutch connecting the power unit to the vertical lift propeller; means for varying the pitch of the torque compensating propeller; and a single control operably connected to the clutch and to the pitch varying means.

7. In a helicopter, the combination comprising: A vertical lift propeller; a torque compensating propeller; drive means connecting the two propellers; a power unit; a clutch connecting the power unit to the vertical lift propeller; means for varying the pitch of the torque compensating propeller; means for operating the clutch; and a single control operably connected to the pitch varying means and to the clutch operating means.

8. In a helicopter, the combination comprising; a vertical lift propeller; a torque compensating propeller; a power unit; a clutch connecting the power unit to the vertical lift propeller; means for controlling the pitch of the torque compensating propeller; and means operable by said pitch controlling means for disengaging the clutch when the pitch controlling means changes the blades of the torque compensating propeller to low positive pitch.

9. An organization as described in claim 8, and drive means connecting the two propellers.

10. In a helicopter having a fuselage and a tail boom connected thereto, the combination comprising: A vertical lift rotor rotatably mounted above the fuselage; a torque compensating propeller mounted near the outer end of the tail boom to produce lateral thrust to compensate the torque produced by the lifting rotor; a power unit; a clutch connecting the power unit and the rotor; means operable to vary the thrust of the torque compensating propeller; and a single pilot operable control operably connected to actuate both the clutch and the thrust varying means.

11. The organization described in claim 10, and drive means connecting the rotor and the propeller.

12. In a vertical lift aircraft having a main lifting rotor and a torque compensating propeller having a plane of rotation intersecting the plane of rotation of the main rotor; an engine for driving the main rotor; a clutch between the engine and the main rotor; means for varying the thrust of the torque compensating propeller; and a single control connected to the thrust varying means and to the clutch to vary the thrust of the torque compensating propeller throughout the maximum range of movement of the control, and to simultaneously actuate the clutch throughout an intermediate range of movement of the control.

CHARLES M. SEIBEL.

REFERENCES CITED

The following references are of record in the file of this patent:

UNITED STATES PATENTS

| Number | Name | Date |
| --- | --- | --- |
| 1,994,488 | Sikorsky | Mar. 19, 1935 |
| 2,317,342 | Pullin | Apr. 27, 1943 |
| 2,318,260 | Sikorsky | May 4, 1943 |
| 2,396,038 | Bossi | Mar. 5, 1946 |